United States Patent Office 3,369,500
Patented Feb. 20, 1968

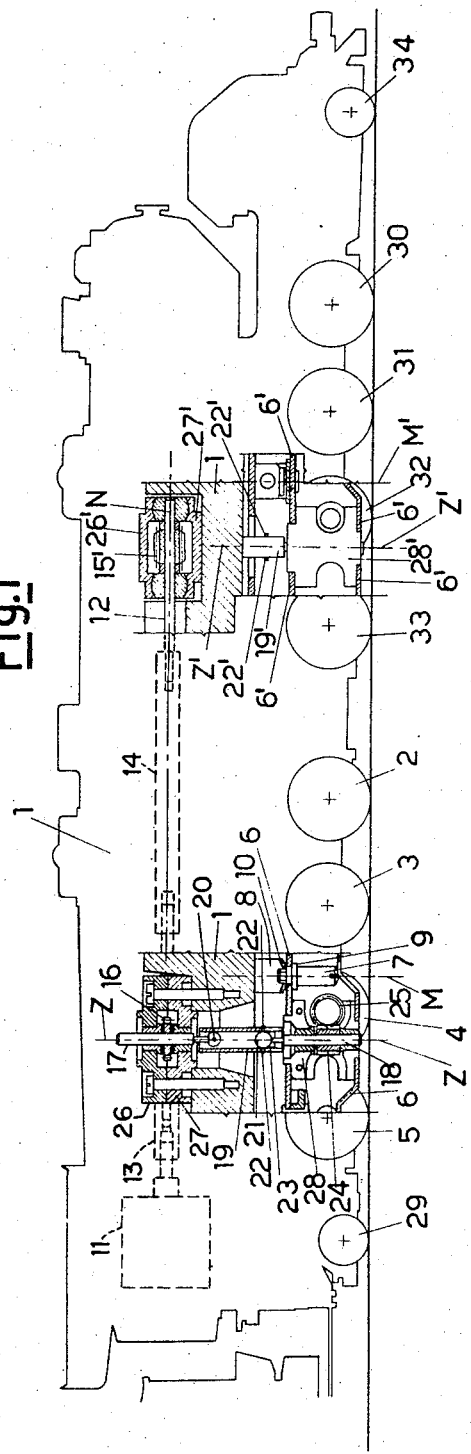
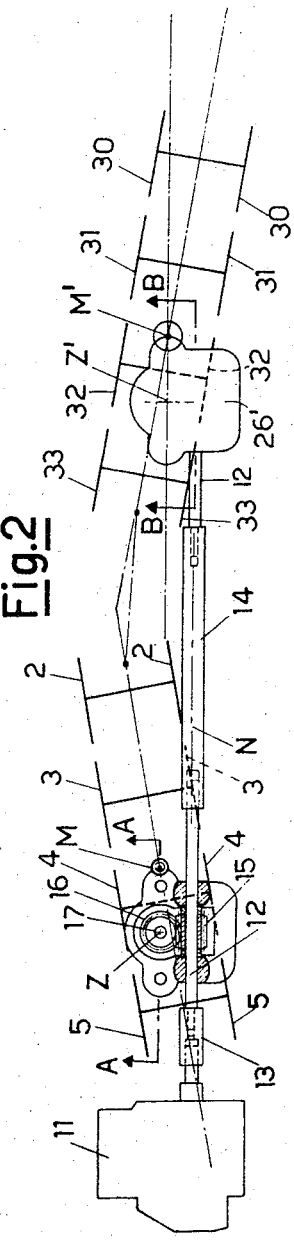

3,369,500
ARTICULATED LOCOMOTIVE DRIVE MEANS
Alessandro Rossi, Via Conciliazione 74, Como, Italy
Filed Dec. 1, 1965, Ser. No. 510,859
Claims priority, application Italy, Dec. 4, 1964, 26,084/64
4 Claims. (Cl. 105—49)

ABSTRACT OF THE DISCLOSURE

A miniaturized locomotive in which two bogies are independently connected from a locomotive body and in turn support respective wheel sets for rotation about respective vertical axes, each wheel set being driven from an output shaft of a motor fixed to the body through a coupling arrangement enabling independent pivotal movement of each of the bogies relative to the output shaft whereby a single motor drives two wheel sets which are independently movable relative to the motor.

Miniaturized articulated locomotives are known, which are virtually similar to the actual articulated "Mallet" type locomotive.

Said miniaturized locomotives, and also the actual prototype to which reference is made herein and which is known under the generic name of articulated Mallet locomotive, have two sets of wheels, one of which is borne by a bogie pivoted to the locomotive body so as to be rotated, relatively to said locomotive body, about a vertical axis, said body comprising a portion which is representative of the boiler and is dubbed also a boiler in the technical parlance in the art. The pairs of wheels of said set are thus enabled to be rotated about respective horizontal axes which, in turn, can be rotated with respect to the body about a vertical axis.

The wheels of the other set are, conversely, pivoted to the locomotive body, that is, every pair of wheels can be rotated about its respective axis which is fixed with respect to the body.

Miniaturized locomotives of the known makes are thus open to objection in a not negligible manner, in that, inasmuch as the axes of a set of wheels are fixed with respect to the body as aforesaid, the locomotive is allowed to travel, in bends, only if the rails have an adequately large radius.

In an endeavor to solve said problem it is possible to make both wheel sets movable about two respective vertical axes, it being moreover possible to provide for both wheel sets being driven by separate motors.

Said solution would satisfactorily solve the problem of travel in bends, i.e. would allow the locomotive to travel over bends of a somewhat reduced radius, but a few shortcomings would nevertheless arise, which are due to the fact that, in practice, it is impossible to obtain the same speed from both motors, especially because very small sized motors are utilized. Thus, for practical reasons, constructional differences can arise and these, as slight as they may be, would nonetheless produce appreciable speed differentials.

The problems enumerated above are solved by the miniaturized locomotive according to the present invention which is essentially characterized by comprising two sets of wheels supported by two respective bogies with respect to which said wheels can be rotated about the respective axes, said bogies being, in turn, pivotally fixed to the locomotive body so as to be rotated about two respective vertical axes, both wheel sets being driving sets actuated by a single motor fixed to the body.

The foregoing and other features of the inventive miniaturized locomotive and the advantages ensuing therefrom will become more apparent from the following disclosure which is illustrative of a non-limiting embodiment of the inventive locomotive as such, with reference to the accompanying drawing, wherein:

FIGURE 1 is a side elevational view of the locomotive, partly in cross-section taken along the lines A—A and B—B of FIG. 2.

FIGURE 2 is a diagrammatical illustration in plan view of the locomotive, shown partly in cross-sectional view along a horizontal plane, a few details having been omitted for simplicity.

The locomotive in question comprises a body, indicated by 1, and two sets of wheels, viz. a front set and a rear set.

Let us consider, more particularly, the rear set: it comprises in the example shown herein, four pairs of wheels, indicated by 2, 3, 4 and 5: each pair of said wheels is pivoted to a bogie 6 so as to be rotated, with respect to said frame, about a respective horizontal axis which is in fixed position with respect to the bogie 6.

The bogie 6, in turn, is pivoted to the body 1 so as to be allowed to be rotated, with respect to the body about an axis M which is fixed with respect to said body. A pivot 7 is fastened to a supporting member 8 solid with the body 1, said pivot passing through a bore formed in the bogie 6 and having a diameter slightly larger than that of the pivot. Beneath said bore the pivot has an enlarged portion 9 which prevents the bogie 6 from being slipped out of the pivot 7, the lower part 10 of the supporting member 8, adapted to contact the bogie, being rounded.

The body 1 also carries a tiny electric motor 11 capable of driving a shaft 12 borne by said body so as to be rotated about its own axis N which is fixed with respect to said body. The numerals 13 and 14 connote two telescoping joints which connect portions of the shaft: the latter, however, could be also made as a single piece. Keyed to the shaft 12 is a gear 15 meshing with another gear 16 keyed to an arbor 17, the latter being borne by the body 1 so as to be rotated about its own axis Z fixed with respect to said body. The numerals 26 and 27 represent two parts of a supporting member of box-like configuration which is affixed to the body 1 and which supports the bearing in which the shaft 12 and the arbor 17 can rotate.

An arbor 18 is borne by the bogie 6 so as to be rotated about its own axis which is fixed with respect to said framing, the bearings for the arbor 18 being supported by a supporting member comprising two pieces 28 affixed to the bogie 6.

The arbor 18 is driven by the arbor 17 via an intermediary arbor 19, the latter being connected, by articulated joints at its ends, to the arbor 17 and the arbor 18, respectively.

More precisely, the arbor 17 is terminated, in its lowermost portion, by a spherical head (solid with the remainder of the arbor) to which a pin 20 is solidly affixed which, with its two ends on opposite sides of the sphere, passes through two bores which are elongate in the direction of the axis of said arbor 19, said bores being formed in the arbor 19. By so doing, in addition to the possibility of a relative rotation between the arbor 17 and the arbor 19 about the pin 20, there is also the possibility of a relative axial sliding of said arbors with respect to one another. A similar connection is provided between the arbor 18 and the arbor 19: the arbor 18 comprises, in its uppermost portion, a small sphere 21 to which are solidly affixed pins 22 which pass through two elongate bores 23 formed in the arbor 19, the pins 22 being shifted 90 degrees apart with respect to the pins 20.

The arbor 18, by means of a pair of gears 24–25, drives the pair of wheels 4, wherefrom the drive is transferred to the other pairs 2, 3 and 5 of the set, through conventional crank-connecting rod mechanisms (not shown as they are known per se). The bogie 6 carries a rear pair of idle wheels 29 pivoted in a supporting member, the latter being pivoted in turn to the bogie 6 so as to be rotated about a vertical axis.

What has been said in the foregoing for the rear set of wheel-pairs 2, 3, 4, 5 applies also to the front set of wheels 30, 31, 32, 33. As a matter of fact, these are pivoted to a bogie 6' which is in turn pivoted to the body 1 so as to be rotated about a vertical axis M' while still having a certain clearance with respect to the body, similar to the bogie 6. Likewise, the pairs of wheels 30, 31, 32, 33 are driving wheels in that they receive the drive from the shaft 12 itself. The device which transfers the drive from shaft 12 to the wheels 30, 31, 32, 33 is very much the same as the device described above for transferring the drive from shaft 12 to the wheels 2, 3, 4, 5. Thus, more particularly, there is provided for the wheels 30, 31, 32, 33 a vertical shaft formed by three pieces corresponding to the pieces 17, 19 and 18 and also connected to one another. The uppermost shank, corresponding to the arbor 17 capable of being rotated about an axis Z' receives the drive from the shaft 12 as the arbor 17 itself, while the lowermost shank, corresponding to the arbor 18, drives the pair of wheels 32 which, in turn, drives the pairs 30, 31, 33 with crank-connecting rod mechanisms.

The parts of the device provided for the pairs 30, 31, 32, 33 are therefore indicated by the same reference numerals, as the corresponding parts provided for the pairs 2, 3, 4, 5 but primed. The pair of wheels 34 is connected to the bogie 6' in the same way as the pair 29 is connected to the bogie 6.

It is apparent that, as the bogies 6 and 6' of the two sets of wheels are allowed to rotate about the two respective axes M and M', the locomotive is enabled to travel smoothly even on bends having a very slight radius.

The fact that the axes Z and Z' of the vertical transmission shafts are offset with respect to said axes M, M' about which the frames can be rotated does not add any difficulties on account of the above described connection between the parts 17, 19 and 18 (and 17', 19', 18' likewise). The possibility of a clearance between the bogie 6 and the body 1 (bore of the bogie 6 having a diameter larger than that of the pivot) and the same possibility being afforded between the bogie 6' and the body permits, among other things, a regular course in spite of irregularities of the rails and slope differentials (e.g. when starting a rise or a fall). The fact that both the sets of wheels are driving sets affords remarkable advantages such as, for example, the possibility of towing a large number of cars.

I claim:

1. A miniaturized locomotive comprising a locomotive body, two bogies independently connected to the body for pivotal movement about respective vertical axes, a set of wheels supported from each frame for rotation about a respective axis, drive means mounted on said body and including a driven output shaft mounted in fixed position in said body for rotation about a fixed axis therein, vertical shafts driven from said output shaft and rotatably mounted in said body for driving the respective set of wheels, the vertical shaft for each set of wheels being offset with respect to the vertical axis about which the associated bogie is pivotably mounted from said body, each said vertical shaft including a plurality of arbors pivotably connected together to permit independent pivotal movement of said bogies relative to the body and output shaft.

2. A locomotive as claimed in claim 1 comprising means connecting each bogie to the body for said pivotable movement about a vertical axis, the latter means comprising a pivot fixed to said body, each bogie having a bore receiving said pivot, said bore having a larger diameter than said pivot such that the bogie is pivotable with clearance.

3. A locomotive as claimed in claim 1 further comprising means connecting said arbors of each vertical shaft for common rotation and relative pivotal and sliding movement whereby the bogies are pivotable with respect to the body.

4. A locomotive as claimed in claim 1 wherein said arbors are three in number and are vertically aligned, the upper arbor being secured in said body, the lower arbor being secured to the associated bogie, the intermediate arbor having opposite ends with elongated slots adjacent each end, said upper and lower arbors including pins secured thereto and extending perpendicular therefrom, said pins being received in respective slots for drivingly coupling the arbors in rotation while permitting relative pivotal movement therebetween.

References Cited

UNITED STATES PATENTS

| 1,776,480 | 9/1930 | Rayburn | 105—99 X |
| 2,708,888 | 5/1955 | Varney | 105—99 |
| 2,774,311 | 12/1956 | Berry | 105—99 |

FOREIGN PATENTS

| 464,657 | 7/1951 | Italy. |
| 28,759 | 12/1911 | Great Britain. |

ARTHUR L. LA POINT, *Primary Examiner.*

J. E. BABER, H. BELTRAN, *Assistant Examiners.*